United States Patent Office
2,999,865
Patented Sept. 12, 1961

2,999,865
EPOXIDES AND METHOD OF PREPARING SAME
Benjamin Phillips and Frederick C. Frostick, Jr., Charleston, W. Va., assignors to Union Carbide Corporation, a corporation of New York
No Drawing. Filed Dec. 31, 1957, Ser. No. 706,302
4 Claims. (Cl. 260—348)

This invention relates to a novel series of synthetic organic chemical compounds and has for an object the provision of new types of triepoxides which are useful in the plastics and resins industry. More particularly, this invention is directed to epoxides of 3-cyclohexene-1,1-dimethanol dialkenoates.

The compounds of this invention can be represented by the general formula:

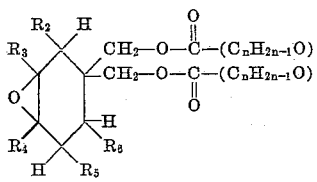

wherein $R_2$ through $R_6$ represent hydrogen atoms or lower alkyl groups and the group $(C_nH_{2n-1}O)$ represents an epoxyalkyl group composed of carbon, hydrogen and one oxygen atom which is attached to vicinal carbon atoms containing $n$ carbon atoms and $2n-1$ hydrogen atoms where $n$ represents a positive integer in the range of from 2 through 17. As used herein, the term "lower alkyl" is intended to include saturated aliphatic hydrocarbon radicals containing from 1 through 8 carbon atoms such as methyl, ethyl, propyl, isopropyl, n-butyl, sec-butyl, tertiarybutyl, amyl, hexyl, heptyl, 2-ethylhexyl and octyl groups.

A preferred class of compounds to which this invention is directed are compounds represented by the structural formula set forth above wherein $R_2$ through $R_6$ represent hydrogen or lower alkyl groups with the further provision that when any of $R_2$ through $R_6$ represent lower alkyl groups, the total number of carbon atoms in said lower alkyl groups does not exceed twelve.

A particularly preferred subclass of compounds within the scope of this invention are those compounds represented by the structural formula set forth above wherein $R_2$—$R_5$ are hydrogen atoms and $R_6$ represents a hydrogen atom or a methyl group.

The compounds of this invention are useful in the preparation of synthetic condensation polymers. One of the most interesting characteristics of the compounds of this invention is the difference in reactivity of the various oxirane rings of the triepoxides. For example, the epoxide group attached to the cyclohexyl ring is more easily attacked by acidic reagents and active hydrogen compounds such as phenols, alcohols, carboxylic acid and the like than are the epoxide groups attached to the fatty acid portions of the molecule. Thus, selective reaction of the cyclohexyl epoxide group can be induced while the other epoxide groups of the fatty acid portions of the molecule are left unattacked. By virtue of this selective reactivity of the oxirane rings of the compounds of this invention, these compounds can be used in preparing soluble, fusible resins capable of being thermoset. Such thermosetting resins are of value for castings, surface coatings and laminates.

The compounds of this invention are prepared by the reaction of peracetic acid and a 3-cyclohexene-1,1-dimethanol dialkenoate. The reaction whereby the compounds of this invention are prepared can be illustrated by the following general formula:

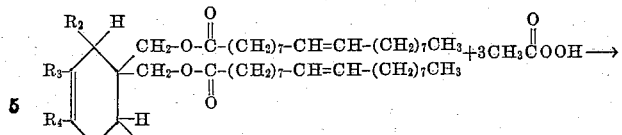

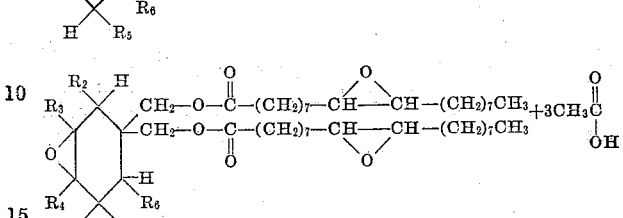

wherein the radicals $R_2$ through $R_6$ are as above defined.

The process of producing the compounds of this invention is carried out at temperatures in the range of from $-25°$ C. to $150°$ C. At lower temperatures, the rate of epoxidation is slow. At higher temperatures, the rate of epoxidation is faster, but precautions are necessary to prevent the further reaction of the epoxide groups. Temperatures in the range of from $10°$ C. to $90°$ C. are preferably used to provide a suitable reaction rate and to avoid undesired side reactions. The triene starting material is conveniently charged to a reaction vessel and the theoretical quantity of peracetic acid is then added. Three or more mols of peracetic acid per mole of triene are usually added to the triene starting material. Both types of double bonds in the molecule are relatively easily attacked by the peracetic acid and the epoxidation of both types appears to proceed simultaneously. The reaction is allowed to proceed until approximately the theoretical amount of peracetic acid is consumed, which is determined by periodic tests for peracetic acid. The time of reaction is usually from about one to ten hours, depending on the temperature. In working up the crude reaction product, it is preferred, although not absolutely necessary, to separate the by-product acetic acid from the epoxide rapidly, since the by-product acetic acid will react with the epoxide to form undesired products thus decreasing the overall yield of triepoxide product. The reaction mixture is then subjected to conventional recovery procedures for the recovery of the triepoxide product. The product can be recovered by extraction with a suitable solvent; continuous distillation or distillation under reduced pressures as desired; or a residue product may be taken.

The starting materials for the production of the triepoxides of this invention are the corresponding triolefins which may be represented by the following general formula:

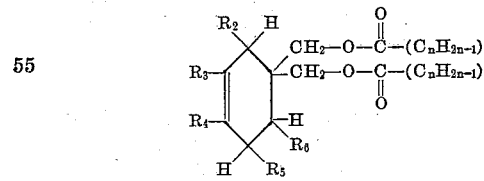

wherein the radicals $R_2$ through $R_6$ are as above defined and the group $(C_nH_{2n-1})$ represents an olefinic hydrocarbon group containing $n$ carbon atoms and $2n-1$ hydrogen atoms where $n$ represents a positive integer in the range of from 2 through 17. These starting materials are prepared by esterification of a 3-cyclohexene-1,1-dimethanol with two equivalents of a monoethylenically unsaturated aliphatic fatty acid. The 3-cyclohexene-1,1-dimethanols are obtained by the reaction of the corresponding 3-cyclohexenecarboxaldehyde (prepared by the Diels-Alder reaction of butadiene or a substituted butadiene with acrolein, crotonaldehyde, and the like) with excess formaldehyde in the presence of a base catalyst such as KOH as described by H. E. French and D. M. Gallagher in J.A.C.S., 64, 1497 (1942). A variety of cycloaliphatic aldehydes suitable for reaction with formaldehyde to form the corresponding 3-cyclohexene-1,1-dimethanols can be produced having alkyl substituents contained in the ring when compounds such as acrolein and crotonaldehyde are reacted with dienes such as butadiene, piperylene, isoprene, 2,3-dimethyl-1,3-pentadiene, and the like.

The preferred 3-cyclohexene-1,1-dimethanols which contain alkyl groups attached to the cyclohexene ring are those with alkyl substituents having from one to four carbon atoms in the alkyl chain such as, for example, methyl, ethyl, propyl, isopropyl, butyl, isobutyl, tertiary butyl groups, and the like.

Particularly preferred 3-cyclohexene-1,1-dimethanols to be used in producing the novel epoxy esters of this invention are 3-cyclohexene-1,1-dimethanol and the methyl substituted 3-cyclohexene-1,1-dimethanols which include representative compounds such as 6-methyl-3-cyclohexene-1,1-dimethanol.

The monoethylenic fatty acids which are suitable for use in preparing the starting compounds are derived from any animal, vegetable or marine oils containing unsaturated fatty acids or they may be derived from the mixed fatty acids contained in such oils. More particularly, the monoethylenic fatty acids used in producing the novel esters of this invention are those fatty acids containing from three through eighteen carbon atoms. A variety of acids containing from three through eighteen carbon atoms are available and include, for example, acrylic acid, methacrylic acid, crotonic acid, butenoic acids, hexenoic acids, decenoic acids, undecenoic acids, and octadecenoic acids, and the like. Preferred monoethylenic fatty acids to be used in producing the novel epoxy esters of this invention are those available from animal and vegetable oils such as oleic acid, elaidic acid, myristoleic acid, palmitoleic acid, ricinoleic acid and erucic acid and mixtures of these acids.

The analysis for the oxirane oxygen content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses for determining epoxidant, that is, peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless end-point. From the titration data thus obtained, a determination of epoxidant content can be made.

In order to determine the acetic acid content of the reaction mixtures, the following procedure can be used, for example, another sample of approximately the same size can be taken at the same time and introduced into a flask containing about 100 milliliters of water and about 15 milliliters of acetaldehyde. The flask and contents are allowed to stand for ten to fifteen minutes after mixing so as to permit whatever peracetic acid and/or acetaldehyde monoperacetate is present in the sample to be converted to acetic acid. The acetic acid of the solution is then titrated with a 0.5 N sodium hydroxide solution using a phenolphthalein indicator. The amount of acetic acid originally present in the same then can be taken to be equal to the final acetic acid content after conversion, as determined by titaration with sodium hydroxide, minus the amount of acetic acid formed by the reaction of peracetic acid with acetaldehyde, or the decomposition of acetaldehyde monoperacetate, originally present in the sample. The amount of acetic acid formed by reaction of peracetic acid with acetaldehyde, or from the decomposition of acetaldehyde monoperacetate, may be calculated from the previous sodium thiosulfate titration determination of epoxidizing agent content on the basis of two mols of acetic acid being formed from each mol of peracetic acid or acetaldehyde monoperacetate.

The following examples will serve to illustrate the practice of the invention:

EXAMPLE 1

*Preparation of 3-cyclohexene-1,1-dimethanol dioleate*

One mol of 3-cyclohexene-1,1-dimethanol (prepared according to French and Gallagher, J.A.C.S., 64, 1497 (1942)) and two mols of oleic acid (Emery Industries grade 233LL Elaine) were refluxed in enough toluene to maintain a kettle temperature below 200° C. and water removed from the system through a decanter. The esterification was complete in 20 hours at 158–178° C. The toluene was removed in a "gooseneck" still to 250°/3 mm. Hg absolute. The acidity was too high and it was necessary to remove a fore fraction in a molecular still to obtain a residue product of low acidity possessing the following properties:

Viscous liquid
Color—8 Gardner
Ester—98.0%
D 20/20—0.9247
N 30/D—1.4735
Iodine No. 86.0

EXAMPLE 2

*Preparation of 3,4-epoxycyclohexane-1,1-dimethanol bis(9,10-epoxystearate)*

Peracetic acid in acetone (6.15 mols, 2050 grams) was added dropwise to 1103 grams (1.64 mols) of 3-cyclohexene-1,1-dimethanol dioleate, with stirring, at a temperature in the range of from 45° C. to 50° C. over a period of 7 hours, whereupon the reaction mixture was stored in a refrigerator overnight. Stirring was continued at the same temperature for an additional period of 4½ hours until an analysis for peracetic acid indicated that 98 percent of the peracetic acid charged to the reaction had been consumed. The reaction mixture was then added dropwise into a reaction flask containing ethylbenzene under reflux. Acetic acid and other low boiling components were removed at the still head and provided 1222 grams of a residue product which analyzed 82.2 percent as the triepoxide by the pyridine-hydrochloride method; an iodine number of 0 and a saponification equivalent of 114 percent. The product had a 5.52 percent oxirane oxygen content and the yield was 85.1 percent of theory. An elemental analysis provided the following:

Carbon: Calc.=73.49 percent; Found=72.54 and 72.47 precent. Hydrogen: Calc.=11.07 percent; Found =10.65 and 10.76 percent.

EXAMPLE 3

*Preparation of 3-cyclohexene-1,1-dimethanol di(10-undecenoate)*

One mole of 3-cyclohexene-1,1-dimethanol and 2 mols of 10-undecenoic acid were refluxed in sufficient toluene to maintain the kettle temperature below 200° C. and water was removed from the system through a decanter. After esterification was complete, the crude product was neutralized and low-boiling products were removed by distillation and the product accepted as a residue. The product was characterized by the following physical properties:

| | |
|---|---|
| Gardner color | ----- |
| Acidity | 0.130 |
| Ester, percent | 98.3 |
| N 30/D | 1.4727 |
| D 20/20 | 0.9555 |

EXAMPLE 4

*Preparation of 3,4-epoxycyclohexane-1,1-dimethanol bis(10,11-epoxyundecanoate)*

A solution of 2.12 mols of peracetic acid in ethyl acetate was added dropwise, with stirring, over a period of one hour and 40 minutes at a temperature in the range of from 50° C. to 55° C. to 315 grams of 3-cyclohexene-1,1-dimethanol diundecenoate. Stirring was continued for an additional 3½ hours, whereupon an analysis for peracetic acid indicated that 94.8 percent of peracetic acid charged to the reaction had been consumed. The reaction mixture was stirred at a temperature of −11° C. for a period of 16 hours. The reaction mixture was removed from storage and passed through a steam stripper to remove ethyl acetate, acetic acid and other low boiling components, and there were obtained 333 grams of a viscous, yellow liquid residue product which analyzed 81.6 percent as 3,4-epoxycyclohexane-1,1-dimethanol bis(10,11-epoxyundecanoate) by the pyridine-hydrochloride method. The oxirane oxygen content of the product was 7.51 percent.

EXAMPLE 5

*Preparation of 3-cyclohexene-1,1-dimethanol dicrotonate*

One mol of 3-cyclohexene-1,1-dimethanol and 2 mols of crotonic acid were refluxed in toluene and the water formed during the reaction was removed through a decanter. After the esterification was complete, the crude product was neutralized and distilled under vacuum. The product was characterized by the following physical properties:

| | |
|---|---|
| Boiling point, ° C./mm. Hg | 124/1.5 |
| Acidity | 0.039 |
| Ester, percent | 97 |
| N 30/D | 1.4892 |
| D 20/20 | 1.0620 |
| Gardner color | 1 |

EXAMPLE 6

*Preparation of 3,4-epoxycyclohexane-1,1-dimethanol bis(2,3-epoxybutyrate)*

Two hundred forty grams of a 27.9 percent solution of peracetic acid in ethyl acetate were added dropwise over a period of one hour and 30 minutes to 65 grams (0.23 mol) of 3-cyclohexene-1,1-dimethanol dicrotonate at a temperature of 85° C. After the addition of the peracetic acid was complete, the reaction conditions were maintained for an additional 3 hours, whereupon an analysis for peracetic acid indicated that the peracetic acid had been consumed. The mixture was then cooled to −10° C. and added dropwise to an equal volume of ethylbenzene which was refluxing under 25 mm. of Hg pressure absolute. The low-boiling components, such as ethyl acetate, acetic acid and ethylbenzene, were removed and there were obtained 90 grams of a residue product. The residue product was subjected to further refinement and there were obtained 84 grams of a product having an oxirane oxygen content of 4.83 percent.

EXAMPLE 7

*Epoxidation of tall oil fatty acid diester of 3-cyclohexene-1,1-dimethanol*

Over a period of 3 hours, 630 grams of a 26.6 percent solution of peracetic acid in ethyl acetate was added dropwise to 360 grams of the tall oil fatty acid diester of 3-cyclohexene-1,1-dimethanol (prepared from a commercial grade of tall oil fatty acids having 47 percent linoleic acid, 51 percent oleic acid and 2 percent saturated acid, a specific gravity (60° F./60° F.) of 0.9048, a Gardner color of 3 and a viscosity (SSV, 100° F.) of 105 and 3-cyclohexene-1,1-dimethanol) at a temperature of from 50° C. to 55° C., with stirring. The reaction was allowed to proceed for an additional one hour and 15 minutes, at the end of which time an analysis for peracetic acid indicated that 98 percent of the peracetic acid charged to the reaction had been consumed. The reaction was allowed to proceed for an additional 30 minutes, whereupon it was passed through a steam-heated stripper maintained at a pressure of 35 mm. of Hg absolute. The residue from the stripper was mixed with 200 grams of ethylbenzene and again passed through the stripper while the pressure was maintained at 5 mm. of Hg absolute. The residue product was further purified by subjecting the same to an additional stripping at 5 mm. of Hg absolute and there were obtained 390 grams of epoxidized tall oil fatty acid diester of 3-cyclohexene-1,1-dimethanol, having an oxirane oxygen content of 6.94 percent.

EXAMPLE 8

*Partial epoxidation of the tall oil fatty acid diester of 3-cyclohexene-1,1-dimethanol*

Over a period of 50 minutes, 298 grams of a 27.7 percent solution of peracetic acid in ethyl acetate was added dropwise to 359 grams of the tall oil fatty acid diester of 3-cyclohexene-1,1-dimethanol, described in Example 7, which was stirring at a temperature of 50° C. At the end of 15 minutes, an analysis for peracetic acid indicated that all of the peracetic acid charged to the reaction had been consumed, whereupon the reaction mixture was passed through a steam-heated stripper which was maintained at a pressure of 35 mm. Hg absolute. The residue was then mixed with 400 cc. of ethylbenzene and recycled at 5 mm. Hg absolute, and the residue was recycled again at the same pressure and there were obtained 374 grams of partially epoxidized tall oil fatty acid diester of 3-cyclohexene-1,1-dimethanol, having an oxirane oxygen content of 4.28 percent.

What is claimed is:

1. A triepoxide, 3,4-epoxycyclohexane-1,1-dimethanol bis(9,10-epoxystearate).
2. A triepoxide, 3,4-epoxycyclohexane-1,1-dimethanol bis(10,11-epoxyundecanoate).
3. A triepoxide, 3,4-epoxycyclohexane-1,1-dimethanol bis(2,3-epoxybutyrate).
4. Compounds of the formula:

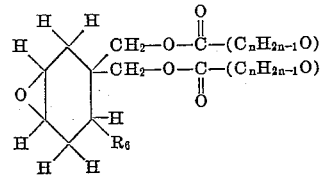

wherein $R_6$ is a member selected from the group consisting of hydrogen and methyl and the group $(C_nH_{2n-1}O)$ represents an epoxyalkyl group composed of carbon, hydrogen and one oxygen atom attached to vicinal carbon atoms containing $n$ carbon atoms and $2n-1$ hydrogen atoms where $n$ represents a positive integer in the range of from 2 through 17.

References Cited in the file of this patent

UNITED STATES PATENTS

| 2,786,066 | Frostick et al. | Mar. 19, 1957 |
| 2,924,582 | Mullins et al. | Feb. 9, 1960 |

FOREIGN PATENTS

| 653,351 | Great Britain | May 16, 1951 |